(12) United States Patent
Johnston, Jr.

(10) Patent No.: US 10,474,444 B2
(45) Date of Patent: Nov. 12, 2019

(54) METHOD AND SYSTEM FOR SECURELY UPDATING A WEBSITE

(71) Applicant: Kevin Johnston, Jr., Sainte-Catherine-de-Hatley (CA)

(72) Inventor: Kevin Johnston, Jr., Sainte-Catherine-de-Hatley (CA)

(73) Assignee: Kevin Johnston, Jr., Sainte-Catherine-de-Hatley (CA)

( * ) Notice: Subject to any disclaimer, the term of this patent is extended or adjusted under 35 U.S.C. 154(b) by 50 days.

(21) Appl. No.: 15/053,633

(22) Filed: Feb. 25, 2016

(65) Prior Publication Data

US 2016/0255090 A1    Sep. 1, 2016

(30) Foreign Application Priority Data

Feb. 26, 2015 (CA) ...................... 2883029

(51) Int. Cl.
| | |
|---|---|
| *G06F 17/21* | (2006.01) |
| *G06F 8/65* | (2018.01) |
| *G06F 21/62* | (2013.01) |
| *G06F 16/958* | (2019.01) |
| *H04L 29/06* | (2006.01) |
| *H04L 29/08* | (2006.01) |

(52) U.S. Cl.
CPC .............. *G06F 8/65* (2013.01); *G06F 16/958* (2019.01); *G06F 21/6218* (2013.01); *H04L 63/083* (2013.01); *G06F 2221/2107* (2013.01); *G06F 2221/2119* (2013.01); *G06F 2221/2141* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,627,199 | B1 * | 1/2014 | Handley | G06F 9/45529 715/234 |
| 9,213,460 | B2 * | 12/2015 | Nurse | G06F 3/048 |
| 2002/0023112 | A1 * | 2/2002 | Avital | G06F 17/21 715/234 |
| 2007/0288589 | A1 * | 12/2007 | Chen | G06F 17/30902 709/217 |
| 2008/0010341 | A1 * | 1/2008 | Curtis | G06F 17/21 709/204 |

(Continued)

*Primary Examiner* — Jason Chiang
(74) *Attorney, Agent, or Firm* — Brouillette Legal Inc.; Robert Brouillette

(57) ABSTRACT

A computer program product for securely updating a website is installed on a computer, uses a WYSIWYG (What You See Is What You Get) editor, and may be used as a multi user, multi site, and multi project with varying per user permissions. A CMS stores the information in a database that can be displayed on a website, and is secured with a hashed password and content can be encrypted. The CMS can store miscellaneous language modes that are color coded such as PHP, JS, CSS, Java, and HTML. There are thus no passwords found in the website source files that make it possible to modify the database content. The security remains solely in the hands of the application and limits hacking. The program product is accessible from a computer-usable or computer-readable medium providing program code for use by or in connection with a computer or any instruction execution system.

20 Claims, 5 Drawing Sheets

(56) References Cited

U.S. PATENT DOCUMENTS

| | | | |
|---|---|---|---|
| 2009/0055755 A1* | 2/2009 | Hicks | G06F 17/3089 |
| | | | 715/760 |
| 2010/0083102 A1* | 4/2010 | Jimenez | G06F 17/24 |
| | | | 715/255 |
| 2011/0023017 A1* | 1/2011 | Calvin | G06F 8/24 |
| | | | 717/120 |
| 2011/0161802 A1* | 6/2011 | Jia | G06F 17/24 |
| | | | 715/235 |
| 2011/0202424 A1* | 8/2011 | Chun | G06F 3/0481 |
| | | | 705/26.8 |
| 2012/0072821 A1* | 3/2012 | Bowling | G06F 17/2247 |
| | | | 715/229 |

\* cited by examiner

METHOD AND SYSTEM FOR SECURELY UPDATING A WEBSITE

CROSS-REFERENCE TO RELATED APPLICATIONS

The present patent application claims the benefits of priority of Canadian Patent Application No. 2,883,029, entitled "Client Web System and Method", and filed at the Canadian Intellectual Property Office on Feb. 26, 2015, the content of which is incorporated herein by reference.

FIELD OF THE INVENTION

The field of the invention relates to methods and systems for securely updating content of a website using a client such as a device running a program. More specifically, the invention relates to methods and systems to manage web site content through a local Content Management Systems (CMS) client application.

BACKGROUND OF THE INVENTION

As of today, security concerns on the web remain one of the highest risks for web developers and for owners/operators of websites. It is a continuous fight between hacker and developer, with the hackers being typically a few steps ahead of the developers. In order to prevent hacking, developers and owners/operators of websites must apply continuous security measures.

Content Management Systems (CMS) have been around for a number of years. Such systems allow the publication of content by users instead of website operators or administrators. Typically, a CMS system allows access to modify content through a user login form hosted on a website. The user can thus login to modify the content of the CMS. Such approach may be problematic as the content may be modified/edited through a web interface which may be hacked by another user or by one of the millions of robots which typically try to break the code using various methods.

A second issue of traditional CMS systems also resides in the login system. A user having a password to log in the CMS system may sign in from any computer which is connected to the internet. The security may be compromised as the connection is unsecured and not entrusted by the company or an authorized computer.

A third issue is that interface to manage the CMS systems may become incompatible when new browsers are introduced. This inconvenience means that many CMS systems fail at one point or another and need to be updated to be compatible with new browsers functions.

A fourth issue which is present in typical CMS systems resides in the updating of the WYSIWYG editor. Many sites are using outdated editors without the new functionalities that are being introduced with the new technology. Each individual site requires to be updated separately and without a centralized automatic update point.

A fifth issue is in regards to the traditional CMS systems which use the leading WYSIWYG editors which consist of thousands of files. Backing up thousands of files takes a lot of unnecessary time & space and makes it harder to keep site versions.

Thus it is believed that there is a need for a system and method for securely updating content of a Content Management System.

SUMMARY OF THE INVENTION

The invention is directed to a system for securely updating a website, the system being as substantially described herein.

The invention is directed to a method for securely updating a website, the method being as substantially described herein.

The invention is directed to the use of a computer program for securely updating a website as substantially described herein.

The invention is also directed to a computer program product for securely updating a website as substantially described herein, the computer program product being accessible from a computer-usable or computer-readable medium providing program code for use by or in connection with a computer or any instruction execution system.

The invention comprises a CMS application used to modify the contents of a website. It is installed on a user's computer. It communicates with a database and it stores information of a website and its content. It uses a WYSIWYG (What You See Is What You Get) editor in order to ensure a user friendly interface for modifying html code. It uses optional coding modules such as JS/CSS/PHP/HTML editors for advanced users or site administrators.

According to one aspect of the invention, the ClientWeb Security System (CWSS) adds an extra level of security to the existing CMS thus ensuring that the system remains functional and compatible with new technology. The CWSS also has the option to centralize updates while making it faster and easier to backup sites with a CMS.

According to one aspect of the invention the CWSS may have multiple layers of security depending on the logged in user and the specific requirements of the owner's website. For example, one user may have access only to a certain section of the website, such as the news section, one other user may not be allowed to add additional pages or change certain page information (such as the pages url) etc.

According to one aspect of the invention, increased security may require the computer having the CWSS application installed to be customized by a network technician for restricting access to the CWSS application or interface. SSL can also be setup for secured database and file connections.

According to one aspect of the invention, the database application has several permissions (select/update/delete/insert) while the web hosting files have a read-only version of the database content (select only). The database application can be setup to have indirect permissions (select/update/delete/insert) by using stored procedures which can limit direct interactions to the database to preauthorised tasks or any other method to communicate with the database to have increased security. For adding security, a valid token can be passed to the stored procedure (example: retrieved from a correct login attempt) in order to process the task. This ensures that the login credentials to modify the database (directly or indirectly) effectively reside within the application thus limiting risks to the point of installations of the application. IP addresses or other security measures may also be used in order to limit access to the database.

According to one aspect of the invention, one (or more) additional database(s) can be configured to store information that is pertinent to the owner of the website, such as CMS login passwords, customized fields. These additional databases can be limited to the application and not accessible thus increasing security to this privileged information. A user's password (and any sensitive information) may also be either hashed and/or encrypted using cryptography practices.

According to one aspect of the invention, other security measures and validation tools can be used such as sending a secondary security password to an email (usage is blocked until the secondary password is also entered by its user), temporarily blocking of a login after a certain amount of failed attempts (an administrator needs to unblock the user, or a certain time-out needs to pass before a password retry), limiting access by a timer or only during certain hours of the day, using security tokens from a valid login etc.

According to one aspect of the invention, the CWSS may be implemented for transactional aspects of a website (client login, shopping carts etc.). As such, regular security can be used by configuring one (or more) database(s) with the proper permissions. The CWSS application may also be merged to an existing application thus removing the need for multiple applications (pertinent to the owner of the website).

According to one aspect of the invention, the application (in part) stores website information in as many languages that are required. This information includes (but is not limited to) the url, page title, page name, page description, keywords, page category, multiple page orders, start & end dates, page date, short & long descriptions (html or plain text), product prices and page contents (html or plain text).

According to one aspect of the invention, any of the text fields in the database may be configured to use a friendly WYSIWYG editor to display and modify the contents or a JS/CSS/PHP/HTML editor. As such, the editors can be hosted on a server. Multiple CWSS applications can access the editor to load and get the raw text of the editor. The editors can be centralized for easy upgrading. The editors do not have direct access to the database. Before saving the text, a validation is done to ensure nobody else has modified the page. If another user has modified the page, then the user has the option to cancel or overwrite the content. Previous versions of the text can be viewed. According to another aspect of the invention, newsletters may be created (formatted with the WYSIWYG editor) and sent. Custom fields may also be added for extra configuration options without having to modify the application. The custom fields can be text, numeric, dates, boolean, and a text field can be formatted using any of the existing modules such as JS/CSS/PHP/HTML.

According to one aspect of the invention, a file manager may be attached to the WYSIWYG editor to manage the files such as upload, modify, delete and rename files. The file manager can be secured by using a security token from a logged in user, the IP addresses of the user, and any other features that can be installed for added security, such as a secondary login system.

According to one aspect of the invention, the CWSS application can essentially do what other CMS systems can do such as, but not limited to, create new pages, delete pages, modify or edit pages, save pages, copy pages, redirect a page to another page, order pages or change order of pages, upload images & documents, put pages offline (manually or with specific dates or times) and can be automatically backed up on each change. Additionally, actions can be logged in order to track who and when the changes were made.

The invention is directed to a computer-implemented method to securely modify the content of a remote site, the content of the remote site being stored in a data source, the method comprising:

a client program configured to load an editor in memory of a client device and to display the editor on the client device;
the client program fetching some content of the remote site from the data source;
the client program sending the fetched content to a data bridge program configured to communicate with the editor;
the data bridge program loading the received content in the editor;
executing operations on the loaded content using the editor;
the client program fetching the resulting content from the editor using the data bridge program; and
the client program sending the content to the data source for storage.

According to a preferred embodiment, the method may further comprise the steps of:
configuring the data bridge program to communicate with the editor;
the client program checking if the related content in the data source has been altered since the content was fetched from the data source;
the client program displaying on the client device a notification that the related content has been altered;
storing a copy of the related content in the data source;
the program sending to the data source a request to overwrite the related content with the content of the editor retrieved by the data bridge;
the client device sending credentials of a user to a login module;
the login module checking if the credentials matched stored credentials;
loading content into the editor only if the credentials are matching with the stored credentials; and
displaying the editor in a web browser on the client device.

In accordance with a preferred embodiment, the operations on the content are, for example, updating, deleting, and/or inserting content and the content is, for example, text, code used in website development such as, but not limited to, JS, PHP, CSS, and HTML, images and files required to display the website.

In a preferred embodiment, the editor may be a What You See Is What You Get (WYSIWYG) type editor or a file-type editor.

Still in accordance with a preferred embodiment, the remote site may be a website and the remote server may be a website hosting server comprising files of the website.

The invention is further directed to a system for securely modifying content of a remote site, the system comprising a computer-readable medium having stored thereon computer-readable instructions, the system further comprising:
a computerized device comprising a processor and the computer-readable medium, the computerized device being in communication with a network;
a data source, the data source being configured to store user credentials and content of the remote site;
an editor;
a data bridge program executed on the computerized device, the data bridge program being configured to:
load data in the editor; and
fetch data from the editor;
a program executed on the computerized device, the program being configured to:
display the editor on the computerized device;
fetching content of the editor from the data source;

communicating the fetched content to the data bridge program, the data bridge program loading the content in the editor;

execute operations on the loaded content using the editor;

fetching the content of the editor using the data bridge program; and storing the fetched content to the data source.

In accordance with a preferred embodiment, the system may be further configured to:

check if related content in the data source has been altered since the content was fetched; and send to the client device a notification that the related content has been altered.

Still in accordance with a preferred embodiment, the system may further be configured to:

compare the content with the related content stored in the data source; and display a notification if the related content was remotely altered by another program.

Still in accordance with a preferred embodiment, the system may further be configured to:

store a copy of the related content in the data source; and overwrite the related content of the data source with the content of the editor.

In a preferred embodiment, the program may be a client application configured to display the editor in a web browser and the remote server may be configured to store the data source and wherein the data source can be retrieved by a web hosting server.

In a preferred embodiment, the system may further comprise a login module adapted to check if a user credentials are matching stored credentials. The content is preferably loaded in the editor only if the user credentials are matching the stored credentials.

According to one aspect of the invention, the list of pages can be viewed by selecting a sorted list. The list can be sorted using any of the available columns (title, url, name, etc.), grouped or filtered by categories. The application can be branded by adding images in its layout. The images can either be fixed or downloaded for a dynamic change.

According to one aspect of the present invention, the step of running a client-side application for an online content management system is automatically done, there is preferably no locally stored data. There is also preferably no synchronizing of data. The CWSS application preferably does not rely on locally stored data, therefore can be used on any system without the need to synchronize data. The installation of the CWSS application gives direct access to the Content Database. It also does not have any problems that synchronization can have, like synchronizing an older version, or having site variations from one installation to another.

According to one aspect of the present invention, the CWSS has no need to have offline access to data which prevents collisions in a multi-user environment where many persons are modifying the same content. The speed is not an issue, since there is only the need to upload images and documents, this step is a required step in order to have the information on the server. Reading a database content is not slow, and ensures data integrity and you can easily ensure that no other user has modified the data before a change is applied. The CWSS application has no need to have local versions of files or images etc. which can cause inconsistencies in the system. Contents of the file server are usually regularly backed up, if the backup system is synchronized a User Computer, then they would have access to all of documents. Using current Synchronizing methods (such as Dropbox™) can make the backed up data available offline to any users that is synched with the synchronizing method. This method is not necessary and used only if a Client requires easier and faster access to their documents. Using the previous example of a synchronizing method, this can be achieved using such backup techniques already. CWSS does not need or require this option, although the option is readily available to do so.

According to one aspect of the present invention, the CWSS application preferably does not manage files, it manages HTML code to view web pages and has an interface to upload documents on a Web Server. It is not associated with a file managing system and does not relate in the fact that the purpose has little or nothing to do with media content. As such, the CWSS application does not use synchronization, the application modifies data directly in the HTML code.

According to one aspect of the present invention, in the CWSS, no repository is used or needed. There are no objects that have a need to be in a repository. The Client Web Owner has complete rights on what they want to have on the website. There is no need to have any versioning tools. Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel method and system for securely updating a website will be described hereinafter. Although the invention is described in terms of specific illustrative embodiments, it is to be understood that the embodiments described herein are by way of example only and that the scope of the invention is not intended to be limited thereby.

The present invention is a system used to securely modify the contents of a remote site, typically a website hosted using a content management system.

Figure 4:
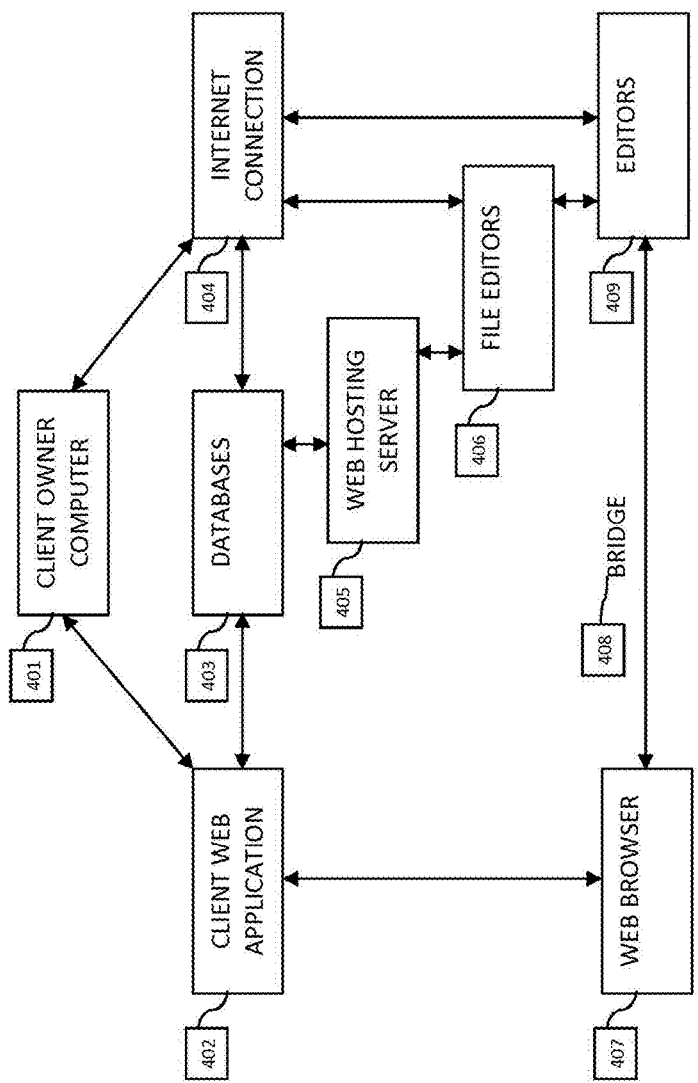
FIG. 4 is a flowchart of a Client owner perspective (main components) of a preferred embodiment.

Now referring to FIG. 4, an embodiment of a system for securely updating a website in accordance with the principles of the present invention is shown. The system comprises a client computing device 401, such as a desktop computer, a tablet, a mobile phone or any other device comprising a CPU, memory and storage unit in communication with a network 404, such as a WAN, the Internet or any other local area network. The system further comprises at least one storage unit 403 which may store user credentials, content of the website or other information relating to transactional operations. The computing device 401 is configured to run a program 402 to execute different operations on the contents of the storage unit 403, such as updating, deleting and inserting data. Such program is typically known as a Content Management System (CMS).

One skilled in the art shall understand that no other components are allowed to modify the content of the storage unit 403.

The File Editors 406 is typically hosted on a server 405 which is configured with read-only access the storage unit 403. The server 405 is configured to validate requests from the plurality of file editors 406 to ensure that the file editors have the proper permissions 313 before modifications may be executed to the files located on the server 405.

The program 402 is configured to communicate with a web browser 407 and the storage unit 403 using a bridge connection 408. The system further comprises file editors 406 which are configured to access to the network 404 and the web hosting server 405. Only a successful validate security 313 check will display a file editor 406.

The system further comprises at least one editor 409 which is typically embodied as WYSIWYG Editors or any other user-friendly editors. The editor 409 are configured to communicate with the bridge 408. The editor may be further configured to format HTML or to color code based on the language, such as JS/CSS/PHP/HTML, in order to be used in the website functionality. The editor 409 may further be configured to format code snippets such as C++ to be displayed on a web site or to be used internally within the program 402. The program 402 is configured to retrieve and to set the values of the text that is displayed by the editor 409 using a common interface or programming language.

The bridge 408 is preferably used to ensure that all required components are able to communicate properly. The bridge typically comprises:

the application 402 communicates with the web browser 407; and the web browser 407 communicates with the editors 409.

The bridge 408 is configured to use a programming language, an interface, a protocol and/or an application programming interface available or compatible with all the components 402, 407, 409. The bridge 408 must also be client side only. The bridge connection 408 is configured to not directly communicate directly with the storage unit 403.

The bridge 408 is configured to be a data transportation interface to retrieve and set formatted data from the editor 409, which originates from the application 402. The actual data of the storing unit 403 does not pass through the server 405 since the set and get operations are client side only. The bridge 408 is configured to ensure that data retrieved and set is identical for any user that installs and uses the program 402. The bridge 408 communicates a notice to the application 402 to indicate that the text of the editor 409 does not match the text stored in the storage unit 403 in the event where the content have been remotely changed or modified. Upon reception of the notice, the program 402 alerts the user to either validate or save again the newly formatted text before starting to manually modify the content. In the case when the contents are saved, a backup of the previous contents is typically stored in the storage unit 403. In the event of the need to retrieve a previous version it is easy to get the previous content restored.

One skilled in the art shall understand that the computing device 401 may be configured in many ways as to communicate with various networks and to be secure. Such configuration may include but are not limited to restrictions via firewall, router, file permission etc. The computer device is also configured to run a bridge 408 between the web browser 407, the editor 409, the program 402 and the storage unit 403.

The web browser 407 is configured to:

communicate with the application 402;

display the editors 409 and/or 406;

to send formatted text from the editors 406 and/or 409 content; and to retrieve formatted text from the editors content 406 and/or 409.

The following is an example of the typical steps required to view and update data:

a) The program 402 comprises a field containing HTML formatted text stored in the content storage unit 403;

b) The program 402 loads a WYSIWYG editor 409 from a web browser 407;

c) The program 402 sets the value of the WYSIWYG Editor to match the current content of the formatted text to the field of the program 402 (see first step a)). Such step is typically completed using a client side programming interface;

d) The user modifies the content using the WYSIWYG Editor 409;

e) The user then clicks on the Save Button 9;

f) The program 402 validates that no other user has modified the data;

g) The program 402 retrieves the current value of the WYSIWYG Editor and stores the value in the field used in step a), typically by using a client side programming interface;

h) The new data is saved to the storage unit 403; and i) The program 402 may be programmed to change or add an alternate storage place for the new data. The program 402 may store the value in a temporary location in order for an administrator to accept the modified value before the new contents may be viewed online.

Figure 5:
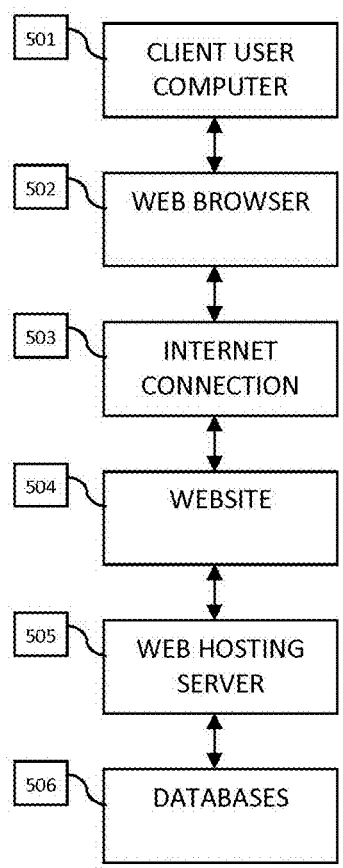
FIG. 5 is a flowchart of a Client user perspective.

Now referring to FIG. 5, a diagram of the perspective of a content consumer user using an embodiment of the present invention is shown. As explained above, no files, storage medium or web pages which contain information allowing the modification or edition of the content of the storage unit 506 may be accessed on the hosting server 505. As an example, even if a user accesses the server 505 using a FTP compatible client, the files found on the Web Hosting Server 505 would not allow the access to the content of the storage unit 406.

The user typically accesses the website 504 using a computing device 501 which is configured to run a program acting as a web browser 502. The web browser 502 accesses the website 504 through a network 503, typically a WAN, the Internet or any other local network.

The website 504 is the client website and may comprise images and any miscellaneous files required to display a website. The website 504 communicates with the server 505 in order to retrieve the content from the storing unit 505. The website 504 has no access to modify the content of the storing unit 506.

The server 505, typically a web hosting server 505 contains most or all of the necessary files to properly display the website. The server fetched content from the storing unit 506 and has a read-only connection to the storing unit 506 in order to properly execute the page mechanics. The web hosting server 505 does not contain files that have a password that can be used to modify the storing unit 506.

The installation and configuration of a CMS system to manage web site content. Now referring to FIG. 1, an example of an interface of an embodiment of the present invention is shown. Such interface is displayed by the program 402 ran by the computing device 401. The interface may comprises one or more of the following identified elements:

1. An identification of the page, such as Unique identifier;
2. Current page category;
3. Add a first level menu page (popup if current contents were modified, the user can cancel and stay on current page or view the new item that has been selected with a Yes/No continue question);
4. Move the order up for the current selected page 16;
5. Move the order down for the current selected page 16;
6. Reduce the current pages level (minimum first level);
7. Increase the current page level (the maximum level depends on the number of levels added in database, three levels are usually sufficient);
8. Add page as a second or third level page (popup if current contents were modified, the user can cancel and stay on current page or view the new item that has been selected with a Yes/No continue question);
9. Save contents (popup if previous contents were modified by another user, can cancel or overwrite contents with a Yes/No continue question);
10. Current page website or project it belongs to;
11. Special title and/or image can be used as a background;
12. Delete current page;
13. List of installed modules, double click to view current module items;
14. Current selected module name (Element 13 contains the names of the modules, Element 1 and 16 are the results of the selected module);
15. Various sorting options to sort the list 16;
16. Current selected module items, double click in order to load the item (popup if current contents were modified, the user can cancel and stay on current page or view the new item that has been selected with a Yes/No continue question);
17. Current page start date to be displayed;
18. Current page end date to be displayed (or no end dates);
19. Current page French page name;
20. Current page French title;
21. Current page French url/after being updated, the url gets converted to lowercase, accents removed and made to be url safe;
22. Current page English page name;
23. Current page English page title ;
24. Current page English url/after being updated, the url gets converted to lowercase, accents removed and made to be url safe;
25. Current page has content (activates html content section, elements 29-38);
26. Current page is active (displays if url is typed in a browser);
27. Administrators can use this to lock certain pages (ie: 404 not found page, home page etc.) from modifying certain information such as url information;
28. Current page date;
29. Current page general tab that can have commonly recurring fields such as meta descriptions, keywords, product prices etc.;
30. Current page main description for the French version (WYSIWYG editor, such as ckeditor™);
31. Current page short description for the French version (WYSIWYG editor);
32. Current page main description for the English version (WYSIWYG editor);
33. Current page short description for the English version (WYSIWYG editor);

The elements 34-38 refer to the current page features specialty sections such as PHP, CSS, JS, HTML code. One shall understand that any other features comprising formatted text may be implemented.

Figure 2:
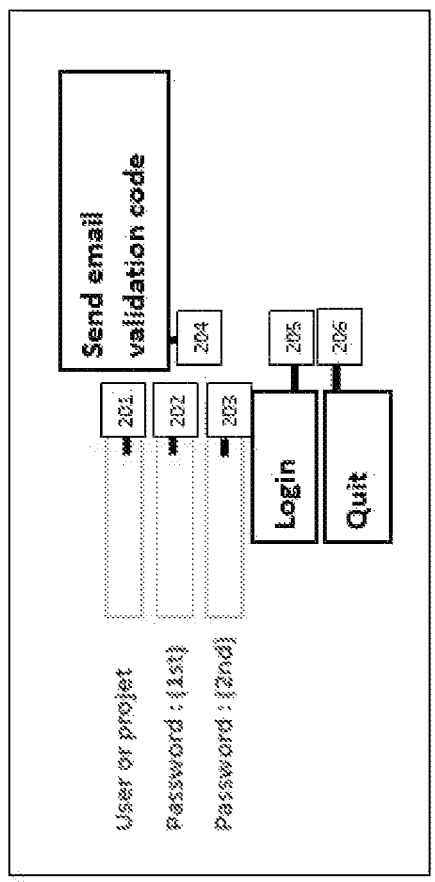
FIG. 2 is a sample login page for the system according to a preferred embodiment of the invention.

38. Current page custom fields are displayed depending on the currently selected custom field (Elements 42-43);
39. Formatting options;
40. Current page loaded content;
41. Add a custom field to the current page;
42. Custom field name;
43. Custom field type. As an example, the field type may be any of the supported modules such as html from the WYSIWYG editor, text, date, numeric, boolean, the various language modes found with CodeMirror plugin http://codemirror.net/mode/index.html, or any other plugin that can communicate with the application;
44. Delete custom field (Elements 42-43);

Now referring to FIG. 2, an example interface of a secured login screen in accordance with the present invention is shown. The interface preferably comprises :

A user identification code such as user name or project name 201;

The current password, which may or may not be secured using cryptography practices 202;

An optional secondary password that may be used for enhanced security 203;

Send/resend the secondary password, the secondary password can be modified 204;

Login button to verify the user, password(s). Failed attempts may block login (various login scripts can be implemented). On successful login, opens form shown in FIG. 1 correctly displaying contents depending on user permissions 205; and An Exits function to exit the program 206.

Figure 3:
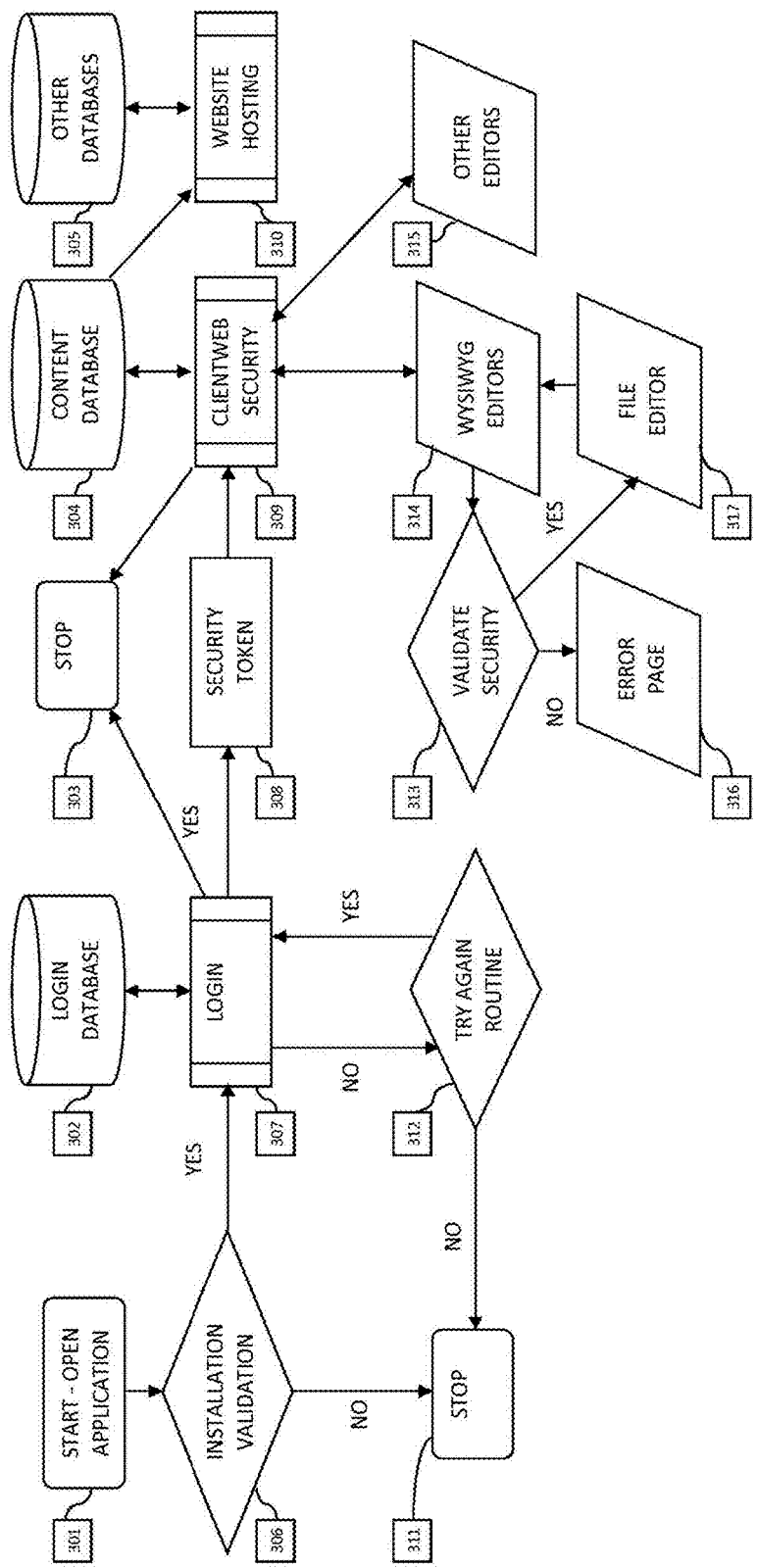
FIG. 3 is a flowchart showing the interactions between the various steps and components of an embodiment of the invention.

Now referring to FIGS. 3 and 4, the method for securely updating a website using a CMS in accordance with the present invention is shown.

The method comprises the step to run or launch the program 402 on a computing device 402. The method further comprises a step to login 302 to the storing unit 403 from the application 402. The login storing unit 302 stores the credentials of the users as no password may shall be stored on the server 405. The login form as one shown in FIG. 3 uses the storing unit 302 to validate user permissions.

The method may further comprise a step to halt the program 303, typically when the operations of the users are completed. During this step, any security tokens are disabled to ensure that there is no more access to the file editor. The user exits the application.

The content storing unit or database 304 may only be accessed by the website hosting server in read-only mode. Only the program 402 may access the content storing unit 304 in read/write mode.

Other Databases 305 may be configured to communicate with the website in order to do transactional operations, such as select/update/delete/insert.

Following the launch of the application, a step to validate the installation 306 is typically executed. The validation typically uses stored cookies, a text file that is properly saved on the computer, a hash of a directory, etc. to validate the installation 306. A valid installation allows the login form 307 to be displayed. An invalid installation typically exits the application.

A login form 307 is used to identify a user willing to access to the program 402. If the user fails the login, a step to try again may be executed ("Try Again Routine" 312). If the user succeeds, a "Security Token" 308 is issued and/or generated. The tokens 308 are to be used mainly for interacting between the various steps validation of the file editor 406 permissions (313 and 317)

A process may be executed to validate security tokens 308, 313 that were generated and stored. Other security tokens may also be modified or added. A failed security check typically displays an Error Page 316. A proper validation allows at least one File Editor 317 to be displayed.

The try-again routine 312 may validate if the application 402 should be blocked from trying more invalid passwords. If blocked then the application 402 exits 311. If the application 402 allows more tries then the application returns to the login script. The routine may automatically send a new secondary password in an email or any other communication method on a failed attempt, thus requiring access to the email account or communication method in order to successfully login 307.

A secured user interface 309 allows adding, modifying and deleting web pages and website information found in the content database 304. The interface 309 communicates with editors 314, 315, 317 to easily format code such as, but not limited to, JS/CSS/PHP/HTML.

A Website Hosting server 310 typically comprises files or any other storage medium. The files shall be configured with read-only permissions on the content storage unit 304 and on the optional storage units or databases 305 which may be configured to communicate with the website in order to, for instance, execute transactional operations such as select/update/delete/insert. The website hosting server 310 is configured to display the website depending on information found in the content database 304 and other files necessary to display the website (images, videos, database connection scripts etc.).

User friendly editors 314, such as WYSIWYG editor are implemented to manipulate HTML code linked to a field in the content storing unit 304. The program 402 sets and gets the values. The editors 314 must validate security 313 before accessing the File Editor 317.

Other editors 315 such as user friendly formatted text editors displaying other pertinent information may be loaded by the application 402. Such editor may format code such as JS/CSS/PHP/HTML.

The file editor 317 allows upload of images & documents to the web server. The file editor 317 is configured to execute all the options of regular file editors such as the option to resize images, rename files and/or move files. The File Editor 317 is configured to require a logged in user with the proper Security Tokens 308 and have passed the Validate Security 313 test before being able to display information to the user.

Figure 1:
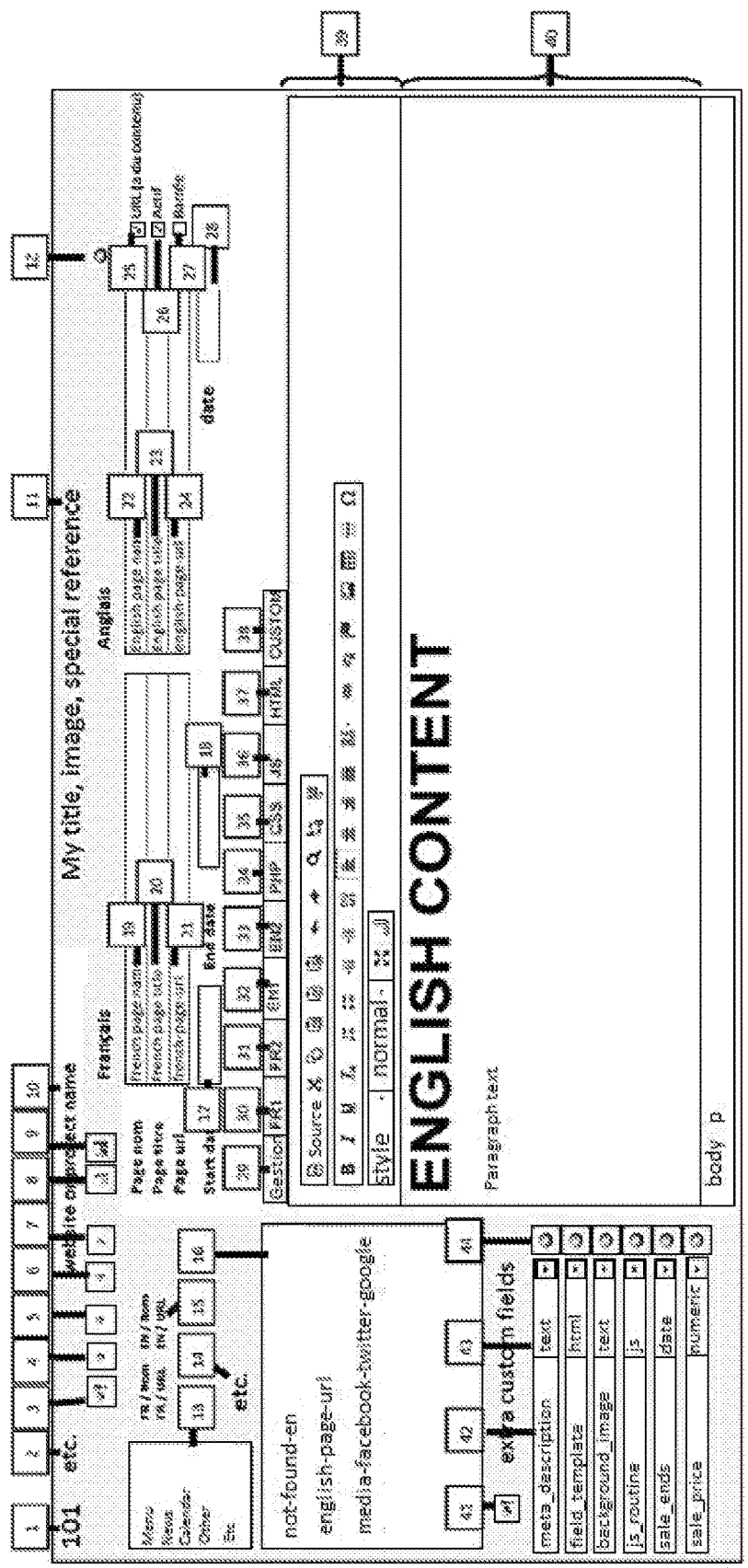
FIG. 1 is a screen shot a preferred embodiment of the invention.

The steps of the flow diagram (FIG. 3) described herein may be implemented in the environments of FIGS. 1-2. The flow diagram may equally represent a high-level block diagram of the invention. The steps of the flow diagram may be implemented and executed from a server, in a client-server relationship, by computing devices in an ad hoc network, or they may run on a user workstation with operative information conveyed to the user workstation Furthermore, an embodiment of the present invention can take the form of a computer program product accessible from a computer-usable or computer-readable medium providing program code for use by or in connection with a computer or any instruction execution system. The software and/or computer program product can be implemented in the environments of FIGS. 1-5.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A computer-implemented method to securely modify the content of a remote site using a desktop client program adapted to display an interface on a client device, the content of the remote site being stored in a data source, the method comprising:
   the client device executing the desktop client program having read and write access to content of the remote site stored in the data source;
   the desktop client program displaying an interface on the client device;
   the desktop client program communicating credentials associated with a user to the data source;
   the data source determining the access levels associated with the communicated credentials;
   the desktop client program fetching some of the content of the remote site from the data source, the determined access levels allowing access to the fetched content;
   the desktop client program storing the fetched content in the memory of the client device;
   the desktop client program determining the stored content to be formatted;
   the desktop client program loading a web browser program;
   the desktop client program sending a request to the web browser program to load an editor associated with the content to be formatted, the editor being capable of formatting the content without any direct access to the content of the remote site of the data source;
   the desktop client program sending the content to be formatted to a data bridge program, the data bridge program being capable of communicating data with the web browser program without any direct access to the content of the remote site of the data source;
   the data bridge program communicating the received content to the editor loaded by the web browser program;
   the desktop client executing operations on the loaded content using the editor loaded in the web browser program;
   the desktop client program sending a request to the data bridge program to fetch the content of the editor;

the data bridge program communicating with the web browser program to fetch the content of the editor and communicating the fetched content to the desktop client program;

the desktop client program sending the content received from the data bridge program to the data source, the desktop client program being capable of checking altered content in the data source since the content received from the data bridge program was fetched from the data source;

the data source storing the content when the determined access levels allow storage access.

2. The method of claim 1, the method further comprising configuring the data bridge program to communicate with the web browser program.

3. The method of claim 2, the method further comprising:
the desktop client program checking if the original fetched content in the data source has been altered since the content was fetched from the data source;
the desktop client program displaying on the client device a notification that the original content has been altered.

4. The method of claim 3, the method further comprising:
storing a copy of the original content in the data source;
the program sending to the data source a request to overwrite the original content with the content of the editor retrieved by the data bridge.

5. The method of claim 1, wherein the operations on the content are selected from the group of updating, deleting, and/or inserting content.

6. The method of claim 1, wherein the content is selected from the group consisting of text, code used in website development, images and files required to display a website.

7. The method of claim 1, wherein the editor is selected from the group of What You See Is What You Get (WYSIWYG) type editor and file-type editor.

8. The method of claim 1, wherein the remote site is a website hosted on a computer server comprising files of the website.

9. The method of claim 1, the method further comprising:
the desktop client program establishing a direct connection with the data source, the direct connection having read and write accesses.

10. A system for securely modifying content of a remote site, the system comprising a non-transitory computer-readable medium having stored thereon computer-readable instructions, the system further comprising:
a computerized device comprising a processor and the computer-readable medium, the computerized device being in communication with a network;
a data source, the data source being configured to:
store user credentials and content of the remote site;
determining the access levels associated with credentials of a user;
store received content when the determined access levels allow storage access;
an editor configured to:
receive content;
load the content;
display the content;
a web browser program executed on the computerized device, the web browser program being capable to load and to display the editor without any direct access to the content of the remote site of the data source;
a data bridge program executed on the computerized device, the data bridge program being configured to receive commands to:
communicate with the web browser program to:
display content in the editor; and
fetch the content from the editor;
communicate the fetched content of the editor to the desktop client program;
wherein the data bridge program is capable of communicating with the web browser and with the desktop client program without any direct access to the content of the remote site of the data source;
a desktop program executed on the computerized device, the desktop program being configured to:
display an interface on the client device to view or modify the content of the data source, the interface originating from the memory of the client device;
communicate credentials associated with a user to the data source;
display the editor on the computerized device;
fetch some of the content of the remote site from the data source;
store the fetched content in the memory of the client device;
determine the stored content to be formatted;
load the web browser program in the displayed interface;
send a request to the web browser program to load the editor;
communicating the content to be formatted to the data bridge program;
execute operations on the content using the editor;
send a request to the data bridge program to communicate with the web browser program to fetch the content of the editor;
receive the requested content of the editor from the data bridge program;
checking altered content in the data source since the content received from the data bridge program was fetched from the data source; and
storing the requested content in the data source.

11. The system of claim 10, the desktop program being further configured to:
check if related content in the data source has been altered since the content was fetched; and
send to the client device a notification that the related content has been altered.

12. The system of claim 11, the desktop program being further configured to:
compare the content with the related content stored in the data source; and
display a notification if the related content was remotely altered by another program.

13. The system of claim 12, the desktop program being further configured to:
store a copy of the related content in the data source; and
overwrite the related content of the data source with the content of the editor.

14. The system of claim 10, wherein the remote server is configured to store the data source and wherein the data source can be retrieved by a web hosting server.

15. The system of claim 10, wherein the operations are selected from the group of updating, deleting and/or inserting.

16. The system of claim 10, wherein the editor is a What You See Is What You Get (WYSIWYG) type editor adapted to manipulate code used in website development.

17. The system of claim 10, the system further comprising a login module adapted to check if a user credentials are matching stored credentials.

18. The system of claim 17, wherein the content is loaded in the editor only if the user credentials are matching the stored credentials.

19. The system of claim 10, the desktop program being further configured to:
   establish a direct connection with the data source, the direct connection having read and write accesses.

20. The system of claim 10, the data bridge program having no direct access to the data source.

* * * * *